United States Patent

[11] 3,570,617

| [72] | Inventor | Leroy George O'Day<br>Wheeling, Ill. |
|---|---|---|
| [21] | Appl. No. | 846,763 |
| [22] | Filed | Aug. 1, 1969 |
| [45] | Patented | Mar. 16, 1971 |
| [73] | Assignee | Ski-Wheels, Inc.<br>Barrington, Ill. |

[54] SNOWMOBILE WITH GROUND-ENGAGING WHEELS
7 Claims, 7 Drawing Figs.

[52] U.S. Cl. ................................................ 180/5, 280/8
[51] Int. Cl. ............................................. B62m 27/02
[50] Field of Search .......................................... 180/3—6; 280/8—11

[56] References Cited
UNITED STATES PATENTS

| 2,093,229 | 9/1937 | Bowman | 180/5 |
| 2,331,561 | 10/1943 | Marr | 280/9 |
| 3,437,354 | 4/1969 | Hefteen | 280/8x |
| 3,477,734 | 11/1969 | Albertson | 280/11 |

Primary Examiner—Richard J. Johnson
Attorney—McDougall, Hersh, Scott & Ladd

ABSTRACT: A snowmobile having at least one ski attached at the front with a leaf spring interposed between the ski and the snowmobile body. A mounting structure for ground-engaging wheels is associated with the ski. The mounting structure comprises a second leaf spring secured at opposite ends to the first-mentioned leaf spring. The wheels associated with the second leaf spring extends downwardly below the bottom surface of the associated ski so that the wheels will provide support in the absence of snow cover sufficient to transfer support to the ski.

PATENTED MAR 16 1971 3,570,617

INVENTOR
Leroy George O'Day
by McDougall, Hersh, Scott
and Ladd
Att'ys

SNOWMOBILE WITH GROUND-ENGAGING WHEELS

This invention relates to an improved snowmobile construction. In a typical snowmobile, the driving force is provided by means of an endless belt which extends from the rear of the vehicle for a substantial distance along its length. The belt thus provides a large surface area for driving engagement whether or not the vehicle is moving on a snow covered surface.

A pair of skis is usually mounted at the front of the vehicle, and the skis are attached through spindles to a steering mechanism. Steering of the vehicle is thus provided by moving the skis about the spindle axis; however, this arrangement is not considered suitable for use on other than snow or ice. The skis are not desirable as means for steering when the vehicle is moved on pavement or bare land, and severe deterioration and damage will also occur if this arrangement is used on other than snow or ice.

In order to increase the versatility of snowmobiles, means have been developed for attaching wheels to the vehicle. In some cases, the wheels are used as replacements for the skis while other proposals have provided for the addition of the wheels without removal of the skis.

Certain disadvantages have characterized prior proposals for providing snowmobiles with wheels. There is a great deal of inconvenience involved when the wheels must be used as replacements for the skis. This is time consuming and has the disadvantage of limiting the use of the vehicle when the terrain is partly snow covered and partly bare.

Some convenience is gained when wheels are attached without requiring removal of the skis. Proposed designs of this type have, however, been unsatisfactory because of unduly complicated attaching means, poor shock absorption when the vehicle is supported by the wheels, and limitations which result when very uneven terrain is encountered. The latter problem usually occurs because the attitude of the skis is not properly controlled resulting in a tendency for the skis to tip forward whereby they are vulnerable to damage when any kind of obstruction is encountered.

It is a general object of this invention to provide an improved snowmobile construction which employs wheels for increasing the versatility of the vehicle.

It is a more specific object of this invention to provide a snowmobile construction which includes means for attaching wheels in a relatively easy fashion without sacrificing the effectiveness of the vehicle when supported by skis, and actually improving shock absorbing characteristics when the vehicle is supported by the wheels.

It is a still further object of this invention to provide means for properly maintaining the attitude of the skis during use of the vehicle so that tilting of the skis to the extent that damage will occur can be effectively avoided.

These and other objects of this invention will appear hereinafter and for purposes of illustration, but not of limitation, specific embodiments of the invention are shown in the accompanying drawings in which.

Figure 1:
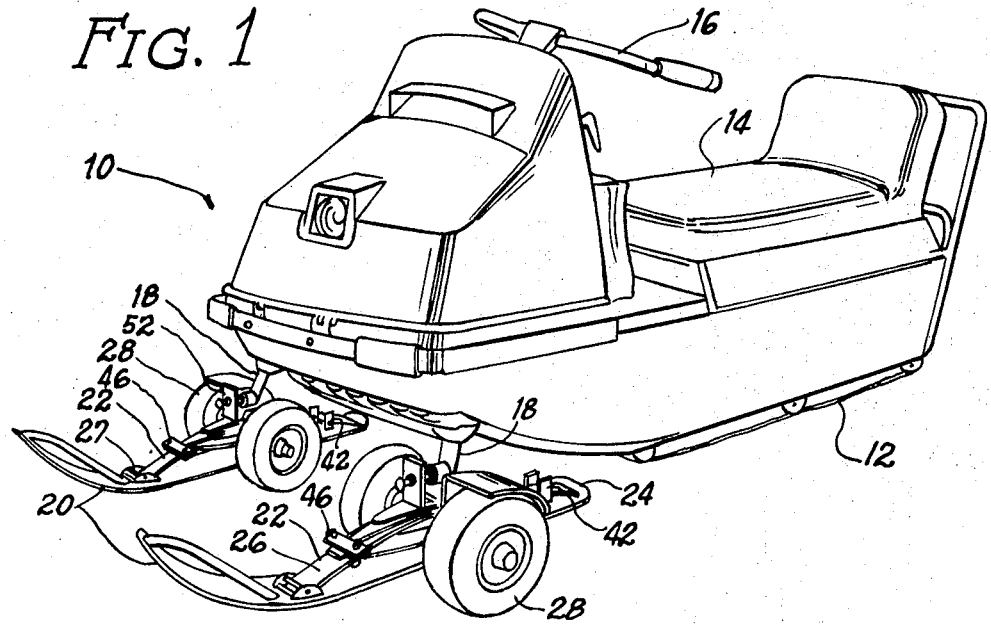
FIG. 1 is a perspective view of a snowmobile characterized by the features of this invention.
Figure 2:
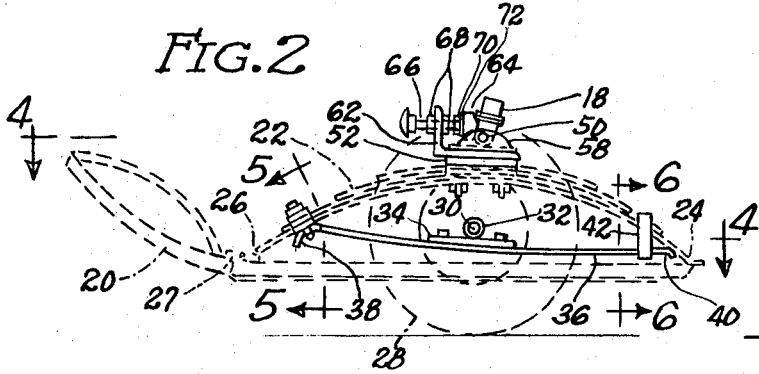
FIG. 2 is a side elevation illustrating a ski having wheels mounted thereon in accordance with the principles of the invention.
Figure 3:
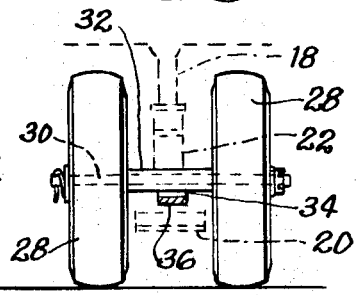
FIG. 3 is a rear elevation of the structure shown in FIG. 2.
Figure 4:
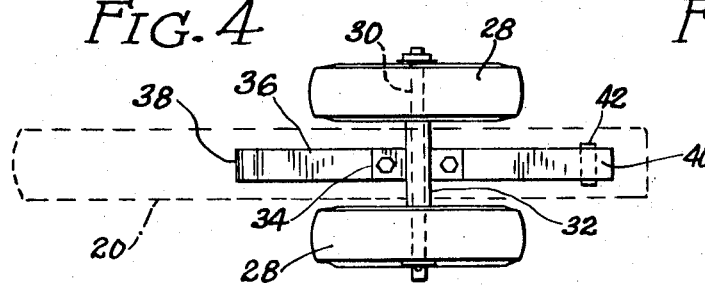
FIG. 4 is a plan view of the structure shown in FIG. 2.
Figure 7:
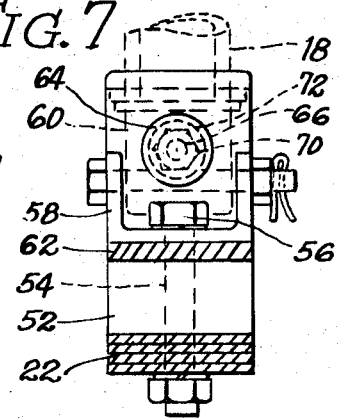
FIG. 7 is an enlarged sectional view taken about the line 7-7 of FIG. 2.
Figures 5, 6:
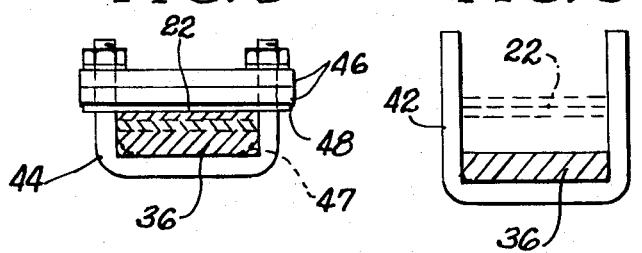
FIG. 5 is an enlarged sectional view taken about the line 5-5 of FIG. 2.
FIG. 6 is an enlarged sectional view taken about the line 6-6 of FIG. 2.

The construction of this invention generally comprises an assembly for attachment to a snowmobile. The assembly consists of a leaf spring and means for mounting at least one wheel with its axis located transversely of the leaf spring.

This arrangement is combined with the leaf spring normally employed for supporting a ski on a snowmobile. The wheel or wheels attached to the ski extend below the bottom surface of the ski so that support will be provided by the wheels when the vehicle moves off snow-covered ground.

The preferred form of the instant invention is illustrated in association with a snowmobile 10 in the accompanying drawing. This snowmobile is of a conventional type having a continuous belt 12 providing the driving force. A seat 14 is provided for one or more riders, and the handle bars 16 are provided for steering purposes.

The steering mechanisms are connected through spindles 18 to a pair of skis 20. In the normal operation of the snowmobiles, the direction of movement is controlled by the attitude of the skis 20 as determined by the handle bars 16.

Each spindle 18 is connected to a ski 20 by means of a leaf spring 22. The rear end 24 of each leaf spring is secured against movement to a ski 20. The forward end 26 of each leaf spring is received in a U-shaped bracket 27 and sliding movement of the leaf spring is permitted. When the weight of the vehicle is supported by skis 20, the leaf springs serve to absorb shock thereby providing a relatively smooth ride on the vehicle.

The specific improvement of this invention involves the attachment of wheels 28 in association with each ski. The wheels 28 are mounted on a shaft 30 with this shaft being received in sleeve 32. The sleeve 32 is welded to a plate 34 which is in turn bolted to a second leaf spring 36. One end 38 of this leaf spring is secured to the leaf spring 22. The opposite end 40 is received in a U-shaped holder 42, and this end of the leaf spring is free to move relative to the leaf spring 22. Each end of the leaf spring 36 is preferably formed with a radius to conform to the curvature of the underside of the leaf spring 22.

In a typical case, the assembly comprising the leaf spring 36 and the wheels 28 can be secured to a ski without requiring removal of the ski from the snowmobile. Thus, the U-shaped holder 42 can be welded to the leaf spring 36 while the holding means for the end 38 can also be attached without the necessity for dismantling any part of the construction. The means for securing the end 38 comprises a U-bolt 44 adapted to embrace the spring 36 and the associated end of the spring 22. A pair of clamping plates 46 are utilized to secure the leaf spring 36 in place. If desired, the leaf spring 36 can be notched as shown at 47 to prevent any slipping of the leaf spring 22 relative to its holding means. A rubber compound 48 may also be interposed between a plate 46 and the surface of the spring 22. This arrangement also aids in holding the position of one leaf spring relative to the other.

In the operation of the construction, the skis 20 will normally provide support for the snowmobile when the structure is moving over snowy terrain. When solid ground is encountered, however, the wheels 28 will take over since these wheels extend downwardly below the bottom surface of the skis. When the wheels 28 are in this position, the shock absorbing function is shared by the springs 36 and 22. Thus, the spring 36 will tend to yield independent of the spring 22 while force is still transmitted to the spring 22 resulting in some shock absorption by this spring.

The skis 20 cooperate with the wheels 28 when the vehicle is driven on bare land. These skis will not touch ground under level conditions, however, if a sudden change in level is encountered, the forward portions of the skis can serve an important function. For example, if the vehicle is driven over a ditch, the skis will tend to bridge across the ditch thereby minimizing the degree of penetration of the wheels 28. This feature makes the snowmobile of this invention particularly suitable for riding over uneven terrain.

To properly take advantage of the skis when riding over uneven terrain, the attitude of the skis with the horizontal is quite important. Thus, if the skis tended to tilt forwardly encountering uneven terrain could lead to catching of the forward portion of the ski in the ground which could cause serious damage.

To prevent undue forward tilting during operation of the snowmobile, the axis defined by the sleeve 32 for holding the wheels 30 is positioned ahead of the pivot axis 50 provided for the skis at the end of the spindles 18. This puts the balance of weight to the rear of the skis so that the rear end will tend to bear on the ground. The forward thrust of the machine serves to bring the skis to a parallel position during operation of the vehicle.

As indicated, the combination of the second leaf spring 36 and the wheels 28 can be attached to a snowmobile without removing the skis. Once attached, the assembly can be kept on indefinitely since the vehicle will operate quite satisfactorily on snow covered ground and on bare terrain.

With some snowmobile designs, spacer means are preferably employed to lower the springs 22 and associated skis relative to the snowmobile body. The spacer may comprise a block 52 which is attached at the top of the spring 22 by means of bolts 54. The heads 56 of the bolts are seated in a saddle 58 which is pivotally attached to the foot 60 of the spindle 18.

An additional alternative feature of the invention involves the use of a level device designed to insure a proper attitude for the skis during vehicle operation. The level device consists of an angle member 62 which is attached between the block 52 and saddle 58 by means of the bolts 54. A rubber cylindrical member 64 is attached at the end of a threaded bolt 66. A pair of nuts 68 hold the bolt 66 in position while a third nut 70 and compression washer 72 are adjustable relative to the bolt 66 for varying the pressure applied by the rubber cylinder 64 and accordingly, for varying the pressure applied by the cylinder to the spindle foot 60. It will be appreciated that this arrangement determines the freedom of movement of the saddle 58 and associated spring and ski relative to the spindle foot 60. The tendency of the skis to nose down or to drag on the ground can thus be significantly reduced.

The arrangements described provide distinct advantages in the operation of snowmobiles since versatility can be easily achieved from the standpoint of satisfactory operation on all terrain. The wheel assembly of this invention can in most cases be quickly attached without removal of the regular snowmobile skis. Where ski removal is necessary because of the snowmobile design, the structure of this invention provides a simple means for including a spacer block to provide necessary variations. Finally, the invention contemplates the use of a device for controlling the attitude of skis associated with the snowmobile so that most satisfactory operation can be accomplished with a minimum possibility of damage.

It will be understood that various changes and modifications may be made in the above-described structure which provide the characteristics of this invention without departing from the spirit thereof particularly as defined in the following claims.

I claim:

1. In a snowmobile construction having at least one steerable ski attached thereto and having a leaf spring interposed between the ski and the snowmobile body, the improvement comprising a mounting structure for wheel means, said mounting structure comprising a second leaf spring having the midportion thereof spaced from the first leaf spring and secured at its opposite ends to said first-mentioned leaf spring, and means attaching at least one wheel to said second leaf spring, the lower portion of said wheel extending downwardly below the bottom surface of said ski.

2. A construction in accordance with claim 1 wherein said wheel means comprise a pair of wheels, the wheels being mounted in spaced relation on opposite sides of the associated ski.

3. A construction in accordance with claim 1 wherein one end of said second leaf spring is fixed to said first leaf spring and the other end of said second leaf spring is movably secured whereby said other end will move relative to said first leaf spring in response to forces transmitted through said wheel.

4. A construction in accordance with claim 1 wherein the mounting location of the wheel means is ahead of the pivot point for the associated ski, the weight on the wheel assembly normally tilting the front end of the ski upwardly.

5. A construction in accordance with claim 1 wherein the means for attaching a wheel to said second leaf spring comprises plate means fixed to said second leaf spring and a tubular member fixed to said plate means for receiving the shaft carrying said wheel.

6. A construction in accordance with claim 1 including leveler means attached to said ski for normally holding the ski in a substantially horizontal position.

7. A construction in accordance with claim 6 wherein said leveler means comprises a resilient element adapted to be adjustably pressed into engagement with the foot of the spindle supporting said ski to restrain pivotal movement of the ski relative to the spindle.